United States Patent Office 3,359,704
Patented Dec. 26, 1967

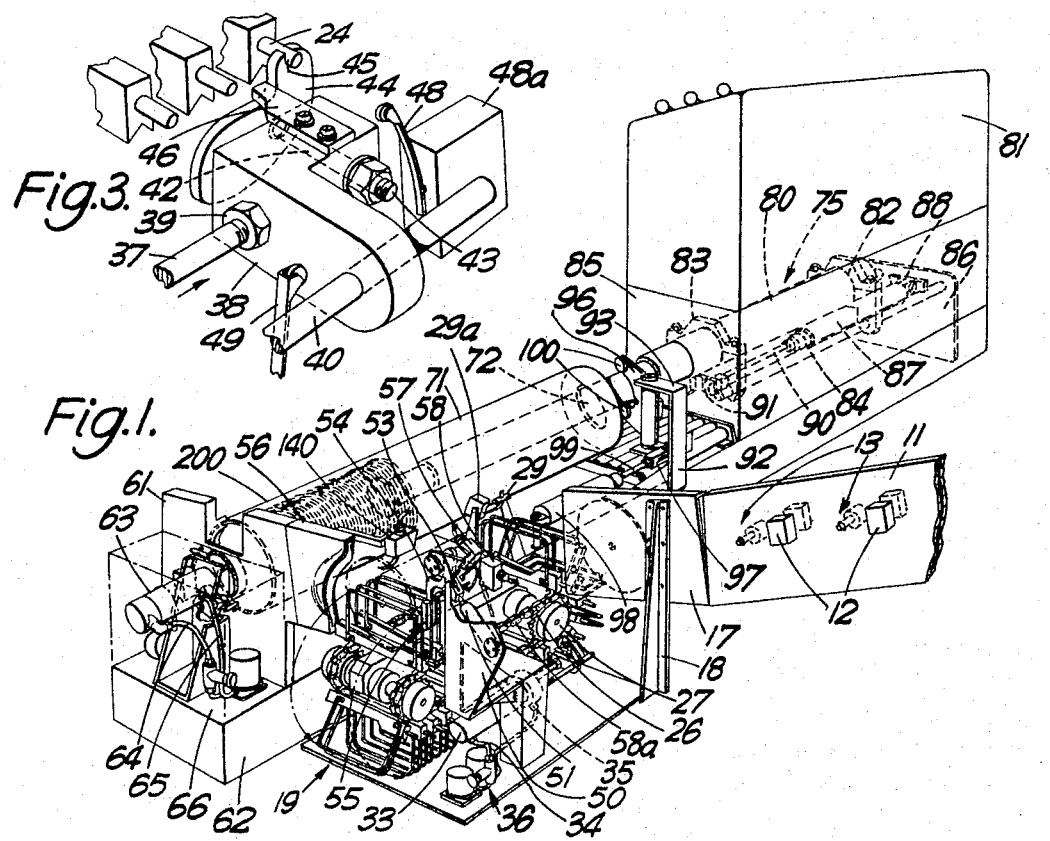

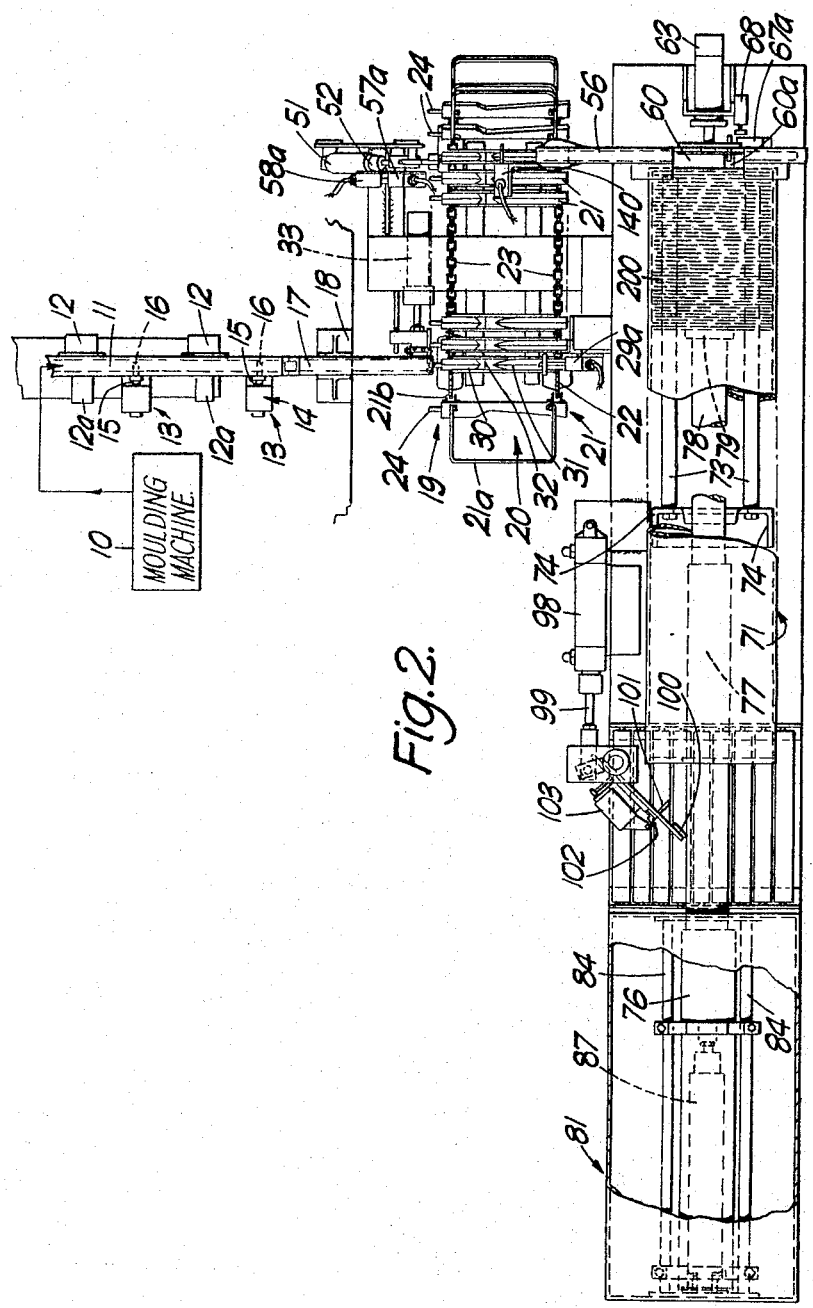

3,359,704
APPARATUS FOR PACKAGING
PHONOGRAPH RECORDS
Alan Phillipson, Basil Harry Royston Spiller, Robin Smith, and Harry Cheesman, London, England, assignors to Decca Limited, London, England, a British company
Filed July 26, 1965, Ser. No. 474,659
Claims priority, application Great Britain,
Aug. 4, 1964, 31,591/64
13 Claims. (Cl. 53—59)

This invention relates to the manufacture of phonograph records by embossing the sound track onto a blank disk which is preformed to the required form of record.

It is now often the practice to make phonograph records by embossing the sound track onto a disk which has been preformed with a central hole and having the centre part thicker than the outer (sound track) region. The embossing operation can be effected very quickly and it thus becomes possible to produce and store blank disks, embossing them when required. The demand for phonograph records is seasonal but the use of this technique enables regular production of blank disks to continue throughout the year. The present invention is concerned more particularly with the manufacture and storage of the blank disks. Such disks can be produced by injection moulding by using a suitable moulding material.

According to this invention, there is provided apparatus for loading blank record disks from a moulding machine into a cylindrical container which apparatus comprises a feed system for feeding each blank disk in succession to a position adjacent one end of the cylinder with the axis of the disk co-linear with the axis of the cylinder, and first and second rams, the first ram having a stroke greater than the length of the cylinder and being arranged to extend through the length of the cylinder to said one end and the second ram being a short stroke ram withdrawable away from the mouth of said cylinder at said one end a sufficient distance to permit a blank disk being fed by said feed system to a position between said second ram and said one end of the cylinder, said second ram being arranged to be quicker operating and to exert a greater force than said first ram, and control means responsive to the passage of a disk through said feed system and operative to withdraw the second ram to permit the disk to move into the position at the mouth of the cylinder and subsequently to force the disk into the cylinder against the force exerted by said first ram. By this arrangement each disk in succession is loaded into the cylinder, the disks in the cylinder being kept in a tight stack by the first ram.

The cylinder, at the end (referred to hereinafter as the far end) opposite to one end may have a partial closure with a central aperture through which the first ram may pass. The first ram may be a narrow diameter rod and may terminate in a disk-shaped member of slightly smaller diameter than the partial closure to form a support for the first blank disk loaded.

Most conveniently the cylinder is located, for loading, with its axis horizontal. A gravity feed system may be employed for feeding the blank disks from the moulding machine; for example a chute may be provided down which the disks can roll in a vertical plane.

The disks, when they leave the moulding press, are still hot, and thus it is desirable to allow them to cool before they are stacked into the cylinder. For this purpose they may be fed from the feed system to a movable disk carrier which conveniently is mounted together with a number of other disk carriers to form an endless chain, the disk being fed to a carrier in a "loading" position and the carrier being moved horizontally step by step in correspondence with the loading of disks into the cylinder until it reaches a second, "unloading" position from which the disk may be moved horizontally to a position adjacent the one end of the cylinder. Each disk carrier may have a base portion with a groove in which the disk sits during horizontal travel between the unloading and loading positions and may have a pair of supporting rods attached to said base and extending along the length of the disk on either side to support it while it is travelling between the loading and unloading positions. By this means, the disks may be allowed to cool in an intermediate stage for a time corresponding to the number of steps a carrier has to move between the "loading" and "unloading" positions. Typically this period would comprise a dozen or so steps and at a rate of one disk being fed from the moulding machine every 20 seconds, the disks may be allowed to cool for several minutes before they are stacked.

Both rams may be pneumatically operated. The second ram must be double acting since it has to be moved in each direction but the first ram need only be single acting since it has only to exert pressure in one direction to keep the blank disks in tight stack. If it is single acting, suitable means may be provided for withdrawing the ram the necessary distance when the loaded cylinder has to be removed. For this purpose the first ram may have its cylinder movably mounted, movement of the ram cylinder being effected by for example a further pneumatic system and cylinder assembly. Furthermore, the first ram may be a double or treble extending ram so that a sufficient length of stroke is obtained for loading the blank disks into a cylinder several feet along.

It would be desirable to provide means for signalling when the cylinder is nearly full and for this purpose there may be provided a probe extending through the partial closure to be engaged by the rear surface of the disk member borne by first ram head when a predetermined number of disks remain to be loaded into the cylinder. Pressure on the probe may operate a microswitch which could for example start the operation of a counter storing the number of disks which were yet to be loaded into the cylinder and the counter, when it reaches zero, may be arranged to inhibit the operation of the second ram.

In the following description, reference will be made to the accompanying drawings in which:

FIGURE 1 is a perspective view of the disk loading apparatus constructed in accordance with the invention;

FIGURE 2 is a plan view from above of the apparatus as shown in FIGURE 1;

FIGURE 3 is a perspective view of part of an advancing mechanism forming part of the apparatus shown in FIGURE 1.

Figure 4:
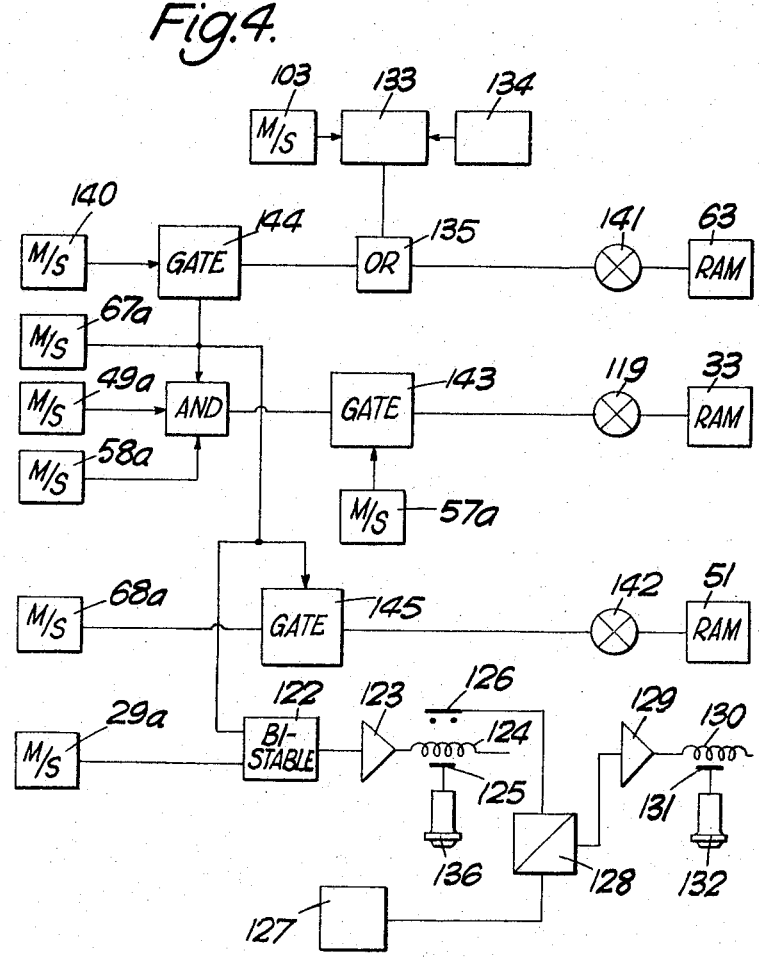
FIGURE 4 illustrates diagrammatically electrical control circuits for the apparatus shown in FIGURES 1, 2 and 3.

Referring firstly to FIGURES 1 and 2, blank disks are fed from a moulding machine (shown diagrammatically at 10) through the narrow vertical duct 11, down which they roll in a vertical plane, past the photo electric cells 12 (each illuminated by a lamp 12a) and the stops 13. The stops 13 are spaced apart a distance slightly greater than the diameter of a disk and the photo electric cells are disposed upstream of the respective stops. In the figures, only two stops and photo electric cells have been shown but as will be explained later, it would be possible to provide more if desired. When a disk is opposite one of the cells, the cell produces an output referred to hereinafter as a BAY FULL signal, the absence of a disk opposite a cell 12 being referred to as a BAY EMPTY condition. Each of the stops 13 comprises a solenoid 14 which, when energised with a signal of one polarity (hereinafter referred to as a "STOP CLOSE" signal), moves the armature 15 into the duct so that the pin 16 may prevent the passage of a disk; the stop being moved back to allow the passage of a disk when the solenoid is fed with a signal of the opposite polarity (hereinafter referred to as a "STOP RELEASE" signal). Provided that the stops are opened, the disks may pass through the feed duct 17, which is mounted on the bracket 18 to pass to a disk carrier assembly 19. The carrier assembly 19 is formed of a plurality of individual disk carriers 20, each comprising a grooved bar 21 bearing supporting brackets 21a and each being attached at either end by a double bracket 21b to a link 22 in one of the chains 23. The individual bars 21 have a projecting pin 24 which protrudes from one end, and the chains 23 are each slung between two pinions 26 rotatably mounted on the cylinders 27. The cylinders 27 are mounted on suitable axles and axle brackets which have not been shown for the sake of clarity. The cylinders 27 are provided with suitable unidirectional free wheel mechanisms (not shown) permitting the carrier assembly 19 to move in the anticlockwise direction as shown in FIGURE 1.

Disks from the loading duct 17 roll into disk carrier 20 opposite thereto on release of the relevant stops 13 and when they are in the carrier 20, the microswitch arm 29 is depressed by the upper edge of the disk so that the microswitch 29a indicates that the record is properly within the carrier. The signal produced thereby is referred to as the "DISK ARRIVED" signal. In this position, the disk sits in the two grooved portions 30 and 31 with its lowermost portion in the area 32 between the grooved portions. The reason for this will be apparent shortly.

The carrier assembly 19 is moved one step at a time in the anticlockwise direction by means of the double acting ram 33 which is fed with a pneumatic pressure for alternate directions of movements through the ducts 34, 35 from the pneumatic source 36. As is more clearly shown in FIGURE 3, the piston moves the piston rod 37, which is secured to the shuttle 38 by means of the screw fitting 39, to move the shuttle 38 along the guide rod 40 so that the latch piece 44, which is mounted on the shuttle 38 by means of the pin 42 and nut 43, can engage the projecting pin 24 in recess 45. Movement of the piston rod in the direction of the arrow will move the projecting pin (and thereby the carrier assembly 19) the effective stroke of the ram 33, which is arranged to be the distance between pins and adjacent disk carriers 20. For this direction of movement, the latch piece 44 is prevented from rotating by the pawl 46 bolted to the upper side of the shuttle. For the other direction of movement, the latch piece 44 will rotate about the pin 42 since the carriage assembly is prevented from movement in the other direction by the unidirectional mechanism provided in the cylinders 27. For both extremes of movement of the shuttle 38, the microswitch arms 48 and 49 are operated by the shuttle, and provide respectively signals from associated microswitches (not shown for the sake of simplicity) denoting the conditions "ADVANCE COMPLETED" and "RETURN COMPLETED."

Successive movements of the carrier assembly 19 move the disk carriers 20 successively from the "loading" position opposite the loading chute 17 to an "unloading" position opposite the entry chute 56. In this position, the carrier assembly is also approximately opposite the bracket 50 which bears a double acting ram 51 moving a piston 52 and link 53 to move a kicker arm 54 and buffer 55 to kick the disk into the entry chute 56. The two extremes of movement of the kicker arm 54 are sensed by the microswitch arms 57 and 58, associated respectively with microswitches 57a and 58a which produce outputs respectively referred to hereinafter as "KICK COMPLETED" and "KICKER RETURNED" when the arms 57 and 58 are struck by the lug 53a on the link 53. When the disk is in the unloading position, the top edge of the disk strikes the microswitch arm 59 to operate the microswitch 140, the output signal therefrom being later referred to as "DISK UNLOAD."

When a disk is "kicked" into the entry chute 56, it comes to rest on a shallow recess 60 which is formed in the bracket 61 mounted on the solid base 62 which also bears the remainder of the apparatus. The disk settles in the shallow groove which is disposed so that the disk is aligned with the open end of the cylinder and is then able to be moved horizontally by the double acting ram 63 which is supplied with pneumatic pressure through the ducts 64 and 65 from the pneumatic source 66. The ram 63 is mounted on the bracket 61a which is in turn mounted on the base 62. Ram 63 is arranged to be quicker acting and to exert a greater force than ram 75 (described below). The microswitch arm 67, controlling microswitch 67a is arranged to protrude from a recess 60a in the shallow recess 60 to sense that the disk has reached alignment with the cylinder producing thereupon a DISK ALIGNED signal. Operation of the ram 63 thus causes the disk to be moved horizontally into the cylinder to be pressed against the stack of disks 200 which are already in the cylinder against the force of the ram 75, which, when the ram 63 withdraws thrusts the stack of disks to abut the bracket 61, where they remain until the next disk is fed to the stack. The microswitch 68 having a fixed extension senses the retracted position of the ram head of the ram 63 the output circuit being referred to as 68a producing the RAM 63 RETURNED signal.

The hollow cylinder 71, having a partial closure 72 at the far end, rests during loading on the supporting rod 73 and the brackets 74 mounted on the base member 61. The stack of disks 200, the disks having been thrust one at a time into the cylinder by ram 63, is kept in a pressed stack by means of the triple extension ram 75 having extending portions 76, 77 and 78 and a disk shaped head 79 which is of slightly smaller diameter than the partial closure 72. The ram cylinder 80 is mounted in the cabinet 81 by means of the brackets 82 and 83 on the guide rods 84 which are secured in the plates 85 and 86 at opposite ends of the cabinet 81. The position of the ram cylinder 80 in the cabinet 81 is controlled by the further double acting ram 87 which is secured to the plate 86 by the link 88 and has a piston 90 attached by the link 91 to the bracket 83. This ram 87 is operative to move the ram cylinder 80 rearwardly so as to disengage the ram 75 from the cylinder 71 when it is desired to remove that cylinder so as to store the stacked disks.

Adjacent the far end of the cylinder 71 is the bracket 92 having trunnions 93 supporting the hinge 94 for the tube cover flap 96. The piston 98 by means of the connecting rod 99, is operative to swing the tube cover flap 96 away from the partial closure 72. The tube cover 96 bears two cork pads 100, which, when the tube cover 96 is closed, rest against the partial closure 72. A sensing probe 101, journalled at 102 extends into the tube when the cover 96 is closed, so that when the tube is nearly full the probe will be depressed by the disk 80 on the end of the extension arm 79. Depression of the probe will operate the microswitch 103 to indicate that the cylinder is nearly full, producing a "BEGIN COUNT" signal.

The foregoing has been a general description of the features of the apparatus and a typical operation of the loading machine will now be described. It will have been noted that there have been mentioned a number of microswitches arranged to sense the positions of various members in the machine and these microswitches are arranged to control the operation of the various pneumatic devices used for advancing the disks from one position to another.

Various modes of operation are possible depending on the sequence of operations desired for the machine. However, the following is one typical mode of operation. In the foregoing, the meaning of the various signals derived from the operation of microswitches has been defined and the following table illustrates a typical routine for the operation of the loading machine.

TABLE 1

| | Signal | Operation |
|---|---|---|
| Step: | | |
| 1 | DISK ALIGNED, MACHINE START. | ADVANCE CARRIER (RAM 33), CLOSE STOP 1. |
| 2 | ADVANCE COMPLETED. | RAM 63 RETRACT, STOP 1 OPEN. |
| 3 | RAM 63 RETURNED. | ADVANCE RAM 51. |
| 4 | KICK COMPLETED. | RETRACT RAM 33. |
| 5 | DISK ARRIVED. | ADVANCE RAM 63, RETRACT RAM 51. |
| Sub Routine 1: | | |
| 1a | STOP ONE CLOSED, BAY ONE EMPTY. | RELEASE STOP TWO. |
| 1b | STOP ONE CLOSED, BAY TWO FULL. | CLOSE STOP TWO. |
| Sub Routine 2 | DRUM TEN DISKS FROM FULL. | BEGIN COUNT. |
| | DRUM FULL. | INHIBIT RAM 63. |

With reference to Table 1 and the figures, the operation of the machine is as follows:

When microswitch 67a produces the DISK ALIGNED signal, solenoid valve 119 is energised to drive ram 33 forward, provided that gate 120 is opened by signals from microswitches 49a and 58a (i.e. rams 33 and 51 are both retracted) and solenoid 124 is de-energised to close stop 136 (STOP ONE), bistable 122 being reset, with no output to amplifier 123.

As ram 33 advances to its forward position microswitch arm 29 is released (since the disk resting against it moves away), causing microswitch 29a to set bistable 122 whose output energises solenoid 124 to open stop 126. Thus a disk will fall into the empty carrier position now aligned with chute 17. Provided that a disk is aligned with entry chute 56 to operate microswitch 140, solenoid valve 141 for ram 63 is energised, from "DISK UNOAD" signal, ram 63 thereby retracting. Ram 63 is arranged to be held retracted unless valve 141 is released. On retraction of rams 63, microswitch circuit 68a is operative to energise solenoid valve from "RAM 63 RETURNED" signal 142 to advance ram 51, kicking the disk into the groove 60.

In its fully forward position, ram 51 operates microswitch 57a, "KICK COMPLETED" signal, cancelling control of solenoid valve 119 for ram 33 by closing gate 143 so that ram 33 retracts.

When a disk arrives at groove 60, microswitch 67a closes gate 144 so that solenoid valve is de-energised so that ram 63 is advanced; ram 51 is retracted by a signal from microswitch 67a closing gate 145.

Should no disk be present in the kick-out position, microswitch 140 is not operated and solenoid valve for ram 63 remains de-energised, ram 63 remaining forward. Ram 51 advances, microswitch 57a, operates, causing ram 33 to retract by closing gate 143.

Concurrent with the main routine are two sub routines. The first sub routine controls the flow of blank disks from the moulding machine and may be adapted for any number of stops. The RELEASE STOP ONE signal from microswitch 67a switches the bistable circuit 122 to a "0" condition, whereupon solenoid 124 is de-energised and the armature 125 and stop 136 (stop 13 nearest duct 17) retract under the force of a spring (not shown). A CLOSE STOP ONE signal from switch 29a switches bistable 122 to produce a "1" signal which is amplified by the amplifier 123 and energises the solenoid 124 to close the stop. In this condition, solenoid contacts 126 are closed, so that if there is no disk being stopped by stop 136, the BAY ONE EMPTY signal from the associated cell 127 opens gate 128 to produce an output signal, amplified by amplifier 129 to energise solenoid 130 to move armature 131 and stop 132 into the closed position. It will be readily seen that the same operation can apply to a third stop and a fourth stop so that a disk is only allowed to move into the nearest position when that position is empty and the stop for that position is closed thus preventing two disks from rolling down at the same time.

Sub routine 2 refers to the operation of the microswitch 103 at the far end of the cylinder, the depressing of the probe 101 producing the DRUM TEN DISKS FROM FULL signal fed to counter 133 which counts down to zero and then produces an INHIBIT RAM 63 signal fed to OR gate 135 to keep solenoid valve energised and thereby keep ram 63 retracted to prevent the ram being operated. In this condition the ram will have completely filled the cylinder and the cylinder may be removed from the supporting rods. The counter 132 may be reset to the required number by the reset circuit 134

We claim:

1. Apparatus for loading blank phonograph disks from a moulding machine into a cylindrical container, comprising a feed system for feeding each blank disk in succession to a position adjacent one end of the cylinder with the axis of the disk co-linear with the axis of the cylinder; first and second rams, said first ram having a stroke greater than the length of the cylinder and capable of extending through the length of the cylinder to said one end; said second ram being a short stroke ram withdrawable away from the mouth of said cylinder at said one end to permit said feed system to feed a blank disk to a position between said second ram and said one end of the cylinder, said second ram being quicker operating and exerting a greater force than said first ram; signalling means producing a control signal when a disk passes through said feed system, control means operatively coupled to said signalling means and said second ram, said control means being operative, on receipt of said control signal, to withdraw the second ram to permit the disk to move into said position, and to operate said second ram.

2. The structure recited in claim 1 wherein the cylinder at the far end opposite said one end has a partial closure with a central aperture through which the first ram may pass.

3. Apparatus for loading blank phonograph disks from a moulding machine into a cylindrical container, comprising a feed system for feeding each blank disk in succession to a position adjacent one end of the cylinder with the axis of the disk co-linear with the axis of the cylinder; first and second rams, said first ram being a single acting ram having a stroke greater than the length of the cylinder and capable of extending through the length of the cylinder to said one end; said first ram being mounted on a carriage movable to withdraw said ram from said cylinder, said second ram being a short stroke ram withdrawable away from the mouth of said cylinder at said one end to permit said feed system to feed a blank disk to a position between said second ram and said one end of the cylinder, said second ram being quicker operating and exerting a greater force than said first ram; signalling means producing a control signal when a disk passes through said feed system, control means operatively coupled to said signalling means and said second ram, said control means being operative, on receipt of said control signal, to withdraw the second ram to permit the disk to move into said position, and to operate said second ram.

4. Apparatus for loading blank phonograph disks from a moulding machine into a cylindrical container, comprising a feed system for feeding each blank disk in succession to a position adjacent one end of the cylinder with the axis of the disk co-linear with the axis of the cylinder; first and second rams, said first ram being a single acting ram having a stroke greater than the length of the cylinder and capable of extending through the length of the cylinder to said one end; said first ram being mounted on a carriage movable to withdraw said first ram from said cylinder, said second ram being a double acting short stroke ram withdrawable away from the mouth of said cylinder at said one end to permit said feed system to feed a blank disk to a position between said second ram and said one end of the cylinder, said second ram being quicker operating and exerting a greater force than said first ram; signalling means producing a control signal when a disk passes through said feed system, control means operatively coupled to said signalling means and said second ram, said control means being operative, on receipt of said control signal, to withdraw the second ram to permit the disk to move into said position, and to operate said second ram; and piston means for moving said carriage to withdraw said first ram.

5. The structure recited in claim 4 wherein said first ram has a plurality of extension portions.

6. Apparatus for loading blank phonograph disks from a moulding machine into a cylindrical container through one end thereof, said cylinder having a partial closure with a central aperture at a second end thereof, comprising a feed system for feeding each blank disk in succession to a position adjacent said one of the cylinder with the axis of the disk co-linear with the axis of the cylinder; first and second rams, said first ram having a stroke greater than the length of the cylinder and capable of extending through said central aperture and the length of the cylinder to said one end; and a ram member comprising a narrow diameter rod bearing a disk shaped terminal member defining a support for a first loaded disk; said second ram being a short stroke ram withdrawable away from the mouth of said cylinder at said one end to permit said feed system to feed a blank disk to a position between said second ram and said one end of the cylinder, said second ram being quicker operating and exerting a greater force than said first ram; means producing a control signalling when a disk passes through said feed system, control means operatively coupled to said signalling means and said second ram, said control means being operative, on receipt of said control signal, to withdraw the second ram to permit the disk to move into said position, and to operate said second ram, signalling means signalling when said cylinder is nearly full of disks; a sensing probe extending through said partial closure to engage said terminal member when the cylinder is nearly full, and operatively coupled to said signalling means, counting means coupled to said signalling means and to said means producing a control signal, arranged to produce an inhibit signal after the receipt of a predetermined number of control signals after receipt of a signal from said signalling means; and inhibit means coupled to said counting means to receive said inhibit signal and to said control means to prevent operation of said second ram.

7. The structure recited in claim 6 wherein said probe is disposed on a hinged support capable of being moved away from said partial closure to permit withdrawal of said second ram.

8. Apparatus for loading blank phonograph disks from a moulding machine into a cylindrical container, comprising a feed system for feeding each blank disk in succession to a position adjacent one end of the cylinder with the axis of the disk co-linear with the axis of the cylinder; first and second rams, said first ram having a stroke greater than the length of the cylinder and capable of extending through the length of the cylinder to said one end; said second ram being a short stroke ram withdrawable away from the mouth of said cylinder at said one end to permit said feed system to feed a blank disk to a position between said second ram and said one end of the cylinder, said second ram being quicker operating and exerting a greater force than said first ram; signalling means producing a control signal when a disk passes through said feed system, control means operatively coupled to said signalling means and said second ram, said control means being operative, on receipt of said control signal, to withdraw the second ram to permit the disk to move into said position, and to operate said second ram, said feed system including a movable disk carrier, said disk carrier having a "loading" position in which a disk can be received and an "unloading" position adjacent said one end of the cylinder, drive means for said disk carrier, said drive means moving said disk carrier step by step, in correspondence with the loading of disks, between said loading and unloading positions; and unloading means unloading a disk from said unloading position to said position adjacent said one end of the cylinder.

9. Apparatus for loading blank phonograph disks from a moulding machine into a cylindrical container, comprising a feed system for feeding each blank disk in succession to a position adjacent one end of the cylinder with the axis of the disk co-linear with the axis of the cylinder; first and second rams, said first ram having a stroke greater than the length of the cylinder and capable of extending through the length of the cylinder to said one end; said second ram being a short stroke ram withdrawable away from the mouth of said cylinder at said one end to permit said feed system to feed a blank disk to a position between said second ram and said one end of the cylinder, said second ram being quicker operating and exerting a greater force than said first ram; signalling means producing a control signal when a disk passes through said feed system, control means operatively coupled to said signalling means and said second ram, said control means being operative, on receipt of said control signal, to withdraw the second ram to permit the disk to move into said position, and to operate said second ram, said feed system including a disk carrier assembly comprising a plurality of disk carriers as an endless chain, each disk carrier having a loading position in which a disk can be received and an unloading position adjacent said one end of the cylinder drive means for said disk carrier assembly; said drive means moving said disk carriers in succession step by step, in correspondence with the loading of disks, between said loading and unloading positions; and unloading means unloading a disk from said unloading position adjacent said one end of the cylinder.

10. Apparatus for loading blank phonograph disks from a moulding machine into a cylindrical container, comprising a feed system for feeding each blank disk in succession to a position adjacent one end of the cylinder with the axis of the disk co-linear with the axis of the cylinder; first and second rams, said first ram having a stroke greater than the length of the cylinder and capable of extending through the length of the cylinder to said one end; said second ram being a short stroke ram withdrawable away from the mouth of said cylinder at said one end to permit said feed system to feed a blank disk to a position between said second ram and said one end of the cylinder, said second ram being quicker operating and exerting a greater force than said first ram; signalling means producing a control signal when a disk passes through said feed system, control means operatively coupled to said signalling means and said second ram, said control means being operative, on receipt of said control signal, to withdraw the second ram to permit the disk to move into said position, and to operate said second ram, said feed system including a movable disk carrier said disk carrier having a "loading" position in which a disk can be received and an "unloading" position adjacent said one end of the cylinder, drive means for said disk carrier, said drive means moving said disk carrier step by step, in correspondence with the loading of disks, between said loading and unloading positions; unloading means unloading a disk from said unloading position to said position adjacent said one end of the cylinder, and said control means comprising means producing a first signal when a disk is in said unloading position and means producing a second signal when a disk is in said position adjacent said one end of said cylinder, and gating means producing said control signal only when both said first and second signals are present.

11. Apparatus for loading blank phonograph disks from a moulding machine into a cylindrical container, comprising a feed system for feeding each blank disk in succession to a position adjacent one end of the cylinder with the axis of the disk co-linear with the axis of the cylinder; first and second rams, said first ram having a stroke greater than the length of the cylinder and capable of extending through the length of the cylinder to said one end; said second ram being a short stroke ram withdrawable away from the mouth of said cylinder at said one end to permit said feed system to feed a blank disk to a position between said second ram and said one end of the cylinder, said second ram being quicker operating and exerting a greater force than said first ram; signalling means producing a control signal when a disk passes through said feed system, control means operatively coupled to said signalling means and said second ram, said control means being operative, on receipt of said control signal, to withdraw the second ram to permit the disk to move into said position, and to operate said second ram, said feed system including a disk carrier assembly comprising a plurality of disk carriers as an endless chain, each disk carrier having a loading position in which a disk can be received and an unloading position adjacent said one end of the cylinder, drive means for said disk carrier assembly; said drive means moving said disk carriers in succession step by step, in correspondence with the loading of disks, between said loading and unloading positions, and unloading means unloading a disk from said unloading position adjacent said one end of the cylinder, said control means comprising means producing a first signal when a disk is in said unloading position and means producing a second signal when a disk is in said position adjacent said one of said cylinder, and gating means producing said control signal only when both said first and second signals are present.

12. The structure recited in claim 11 wherein each disk carrier has a projecting portion, and wherein said carrier assembly drive means successively engaged on projecting portion to move it a fixed distance in one direction for each step of movement of said assembly.

13. In a blank phonograph disk loading machine, the combination comprising:
 a cylinder having an open first end and a partially closed second end;
 a first ram extending through said second end;
 a second ram operative to force disks successively into said first end against the force of said first ram;
 a feed system providing disks successively to a position in front of said control second ram; and
 control means responsive to the passage of a disk through said feed system and operating said second ram thereafter.

No references cited.

TRAVIS S. McGEHEE, *Primary Examiner.*